(12) United States Patent
Narasimhan et al.

(10) Patent No.: US 10,291,922 B2
(45) Date of Patent: May 14, 2019

(54) METHOD AND APPARATUS FOR DECODING AN ENHANCED VIDEO STREAM

(71) Applicant: ARRIS Enterprises, Inc., Suwanee, GA (US)

(72) Inventors: Mandayam Narasimhan, San Diego, CA (US); Ajay K. Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 124 days.

(21) Appl. No.: 14/521,763

(22) Filed: Oct. 23, 2014

(65) Prior Publication Data

US 2015/0117550 A1  Apr. 30, 2015

Related U.S. Application Data

(60) Provisional application No. 61/896,367, filed on Oct. 28, 2013.

(51) Int. Cl.
   *H04N 19/46* (2014.01)
   *H04N 19/169* (2014.01)
   (Continued)

(52) U.S. Cl.
   CPC .......... *H04N 19/188* (2014.11); *H04N 19/30* (2014.11); *H04N 19/46* (2014.11); *H04N 19/61* (2014.11);
   (Continued)

(58) Field of Classification Search
   CPC ...... H04N 19/188; H04N 19/30; H04N 19/46; H04N 19/61; H04N 21/23605; H04N 21/23608
   (Continued)

(56) References Cited

U.S. PATENT DOCUMENTS

| 8,369,415 B2 | 2/2013 | Narasimhan |
| 8,599,932 B2 | 12/2013 | Narasimhan |

(Continued)

FOREIGN PATENT DOCUMENTS

| EP | 2194717 A2 | 6/2010 |
| WO | 2012105265 A1 | 8/2012 |

OTHER PUBLICATIONS

PCT Search Report & Written Opinion, Re: Application No. PCT/US2014/061985, dated Jan. 22, 2015.
(Continued)

*Primary Examiner* — William C Vaughn, Jr.
*Assistant Examiner* — Jae N Noh
(74) *Attorney, Agent, or Firm* — Lori Anne D. Swanson

(57) ABSTRACT

Disclosed are herein are methods and systems for encoding and decoding enhanced video streams using a legacy and scalable video components. In one aspect, a method of encoding video data in a packetized elementary stream (PES), is disclosed. The method includes receiving a signal including frames of image data, wherein the frames include base layer and enhancement layer components; encoding the frames of image data to form video access units (AUs), wherein base layer AUs are formed for base layer components and enhancement layers AUs are formed for enhancement layer components, each AU including: an elementary stream header (ELSM) including image data metadata parameters associated with decoding and displaying the image data; a PES header including a presentation time stamp (PTS) and a PES packet length indicating the length of the PES header; one or more codestreams associated with a frame of the image data; adding a network abstraction layer (NAL) unit header defined by an enhancement layer video standard to each base layer AU, the NAL unit header being a constant value and length; and forming a modified (Continued)

PES header by increasing the PES packet length to include the length of the NAL unit header in it.

13 Claims, 11 Drawing Sheets

(51) Int. Cl.
    H04N 21/236    (2011.01)
    H04N 19/30     (2014.01)
    H04N 19/61     (2014.01)
    H04N 19/66     (2014.01)

(52) U.S. Cl.
    CPC . H04N 21/23605 (2013.01); H04N 21/23608 (2013.01); H04N 19/66 (2014.11)

(58) Field of Classification Search
    USPC .................................................. 375/240.26
    See application file for complete search history.

(56) References Cited

U.S. PATENT DOCUMENTS

| | | | |
|---|---|---|---|
| 2011/0032999 A1* | 2/2011 | Chen | H04N 21/234327 375/240.26 |
| 2011/0110436 A1* | 5/2011 | Schierl | H04N 21/234327 375/240.26 |
| 2013/0016776 A1* | 1/2013 | Boyce | H04N 19/30 375/240.06 |
| 2014/0016694 A1* | 1/2014 | Boyce | H04N 19/70 375/240.02 |

OTHER PUBLICATIONS

J. Samuelsson, et al., "AHG15: AVC and HEVC encapsulation for hybrid codec scalability", 15th JCT-VC Meeting (Joint Collaborative Team on Video Coding of ISO/IEC JTC1/SC29/WG11 and ITU-T SG.16), Oct. 15, 2013.

B. Choi, et al., "Mlulti-standard extension design", 12th JCT-VC Meeting (Joint Collaborative Team on Video Coding of ISO/IEC JTC1/SC29/WG11 and ITU-T SG.16), Jan. 8, 2013.

J. Boyce, "Specification text to support AVC base layer in HEVC layered extensions", 5th JCT-3V Meeting (Joint Collaborative Team on 3D Video Coding Extension Development of ISO/IEC JTC1/SC29/WG11 and ITU-T SG.16), Jul. 17, 2013.

B. Bross, et al., "High Efficiency Video Coding (HEVC) text specification draft 10 (for FDIS & Last Call), JCTVC-L1003 V32", Joint Collaborative Team on Video Coding (JCT-VC) of ITU-T SG 16 WP 3 and ISO/IEC JCT 1/SC 29/WG 11, vol. JCTVC-L1003 v32, Mar. 16, 2013.

Anonymous, "Packetized elementary stream—Wikipedia, the free encyclopedia", retrieved from the Internet at <http://web.archive.org.web/20120403092609/http://en.wikipedia.org/wiki/Packetized_Elementary_Stream> on Jan. 13, 2015.

Anonymous, "Elementary stream—Wikipedia, the free encyclopedia", retrieved from the Internet at <http://web.archive.org/web/20130815170903/http://en.wikipedia.org/wiki/Elementary_stream> on Jan. 13, 2015.

* cited by examiner

METHOD AND APPARATUS FOR DECODING AN ENHANCED VIDEO STREAM

CROSS-REFERENCE TO RELATED APPLICATIONS

The present application claims priority to U.S. Provisional Patent Application 61/896,367, entitled "Proposal for PES encapsulation of AVC base layer HEVC NAL units" filed on Oct. 28, 2013, which is incorporated herein by reference in its entirety.

TECHNICAL FIELD

The present disclosure is related generally to systems and methods for decoding an enhanced video stream.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, "smart phones," video teleconferencing devices, video streaming devices, etc. Digital video devices implement video coding techniques, such as those described in the standards defined by MPEG-2, MPEG-4, H.264/MPEG-4, Part 10, Advanced Video Coding (AVC), High Efficiency Video Coding (HEVC), and extensions of such standards, such as Scalable Video Coding (SVC). The video devices may transmit, receive, encode, decode, and/or store digital video information more efficiently by implementing such video coding techniques.

Currently the HEVC scalable specification supports an application model where the base layer is AVC video with enhancements using scalable HEVC. However, the transport of such scalable streams requires the AVC base layer to be available to a legacy decoder without the scalable HEVC enhancements in the video stream.

SUMMARY

Described herein are methods and systems for encoding and decoding enhanced video streams using a legacy and scalable video components.

In a first aspect, a method of encoding video data in a packetized elementary stream (PES), is disclosed. The method includes receiving a signal including frames of image data, wherein the frames include base layer and enhancement layer components; encoding the frames of image data to form video access units (AUs), wherein base layer AUs are formed for base layer components and enhancement layers AUs are formed for enhancement layer components, each AU including: an elementary stream header (ELSM) including image data metadata parameters associated with decoding and displaying the image data; a PES header including a presentation time stamp (PTS) and a PES packet length indicating the length of the PES header; one or more codestreams associated with a frame of the image data; adding a network abstraction layer (NAL) unit header defined by an enhancement layer video standard to each base layer AU, the NAL unit header being a constant value and length; and forming a modified PES header by increasing the PES packet length to include the length of the NAL unit header in it. In an embodiment of the first aspect, the method further includes mapping the AUs into PES packets; and ordering the PES packets to form a PES in a transport stream, wherein the transport stream includes a base layer formed from base layer AUs and an enhancement layer formed from enhancement layer AUs. In an embodiment of the first aspect, the base layer AUs include AVC or MPEG-2 video data. In an embodiment of the first aspect, the enhancement layer AUs include HEVC or AVC video data. In an embodiment of the first aspect, the base layer AUs are AVC video data and the NAL unit header is HEVC video data. In an embodiment of the first aspect, a NAL unit header directly precedes each base layer AU. In an embodiment of the first aspect, each HEVC NAL unit header is configured to signal and carry each AVC AU. In an embodiment of the first aspect, each AVC AU includes at least one of: AU delimiter, SEI, SPS, PPS, and video slices. In an embodiment of the first aspect, the method further includes mapping the AUs into PES packets; and ordering the PES packets to form a PES in a transport stream, wherein the transport stream includes a base layer formed from base layer AUs and an enhancement layer formed from enhancement layer AUs, wherein the transport stream includes at least two packet identifiers (PIDs) and a program map table (PMT), and wherein the AVC base layer PES packets are carried in a first dedicated PID. In an embodiment of the first aspect, the PMT signals the base layer AVC with MPEG defined stream type of 0x1B. In an embodiment of the first aspect, the NAL unit header is an HEVC enhancement layer and wherein the HEVC enhancement layer is carried in a second dedicated PID. In an embodiment of the first aspect, the PMT signals the HVC enhancement layer with a new stream type value defined by MPEG. In an embodiment of the first aspect, the base layer AUs are MPEG-2 video data and the NAL unit header is defined in AVC video data. In an embodiment of the first aspect, the base layer AUs are MPEG-2 video data and the NAL unit header is defined in HEVC video data.\

In a second aspect, a method of decoding video data in a packetized elementary stream (PES) is disclosed. The method includes receiving a transport stream including the PES, wherein the PES includes frames on image data in video access units (AUs) including both base layer AUs and enhancement layer AUs, wherein base layer AUs are formed from base layer components and enhancement layer AUs are formed from enhancement layer components, each AU including: an elementary stream header (ELSM) including image data metadata parameters associated with decoding and displaying the image data; a network abstraction layer (NAL) unit header for each base layer AU; a modified PES header including a presentation time stamp (PTS) and a PES packet length indicating the length of the PES header plus a constant value, wherein the constant value represents the length of the NAL unit header; one or more codestreams associated with a frame of the image data; removing the modified PES header and NAL unit for each base layer AU; and decoding each base layer AU to form a signal including frames of image data. In an embodiment of the second aspect, the decoding is performed by a legacy decoder.

In a third aspect, a method of decoding video data in a packetized elementary stream (PES) is disclosed. The method includes receiving a transport stream including the PES, wherein the PES includes frames on image data in video access units (AUs) including both base layer AUs and enhancement layer AUs, wherein base layer AUs are formed from base layer components and enhancement layer AUs are formed from enhancement layer components, each AU including: an elementary stream header (ELSM) including image data metadata parameters associated with decoding and displaying the image data; a network abstraction layer (NAL) unit header for each base layer AU; a modified PES header including a presentation time stamp (PTS) and a PES packet length indicating the length of the PES header plus a constant value, wherein the constant value represents the length of the NAL unit header; one or more codestreams associated with a frame of the image data; forming an original PES header by decreasing the modified PES packet length by the constant value that represents the NAL unit header length; removing the original PES header for each base layer AU; removing the original PES header for each enhancement layer AU; and decoding each base layer AU and each enhancement layer AU to form a signal including frames of image data. In an embodiment of the third aspect, the method further includes receiving a signal indicating that the modified PES header will be decremented by the constant value.

In a fourth aspect, a system configured to encode video data in a packetized elementary stream (PES) is disclosed. The system includes a processor configured to receive a signal including frames of image data, wherein the frames include base layer and enhancement layer components; encode the frames of image data to form video access units (AUs), wherein base layer AUs are formed for base layer components and enhancement layers AUs are formed for enhancement layer components, each AU including: an elementary stream header (ELSM) including image data metadata parameters associated with decoding and displaying the image data; a PES header including a presentation time stamp (PTS) and a PES packet length indicating the length of the PES header; one or more codestreams associated with a frame of the image data; add a network abstraction layer (NAL) unit header defined by an enhancement layer video standard to each base layer AU, the NAL unit header being a constant value and length; form a modified PES header by increasing the PES packet length to include the length of the NAL unit header in it; and a storage device configured to store the frames of image data, and executable instructions for controlling the processor.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
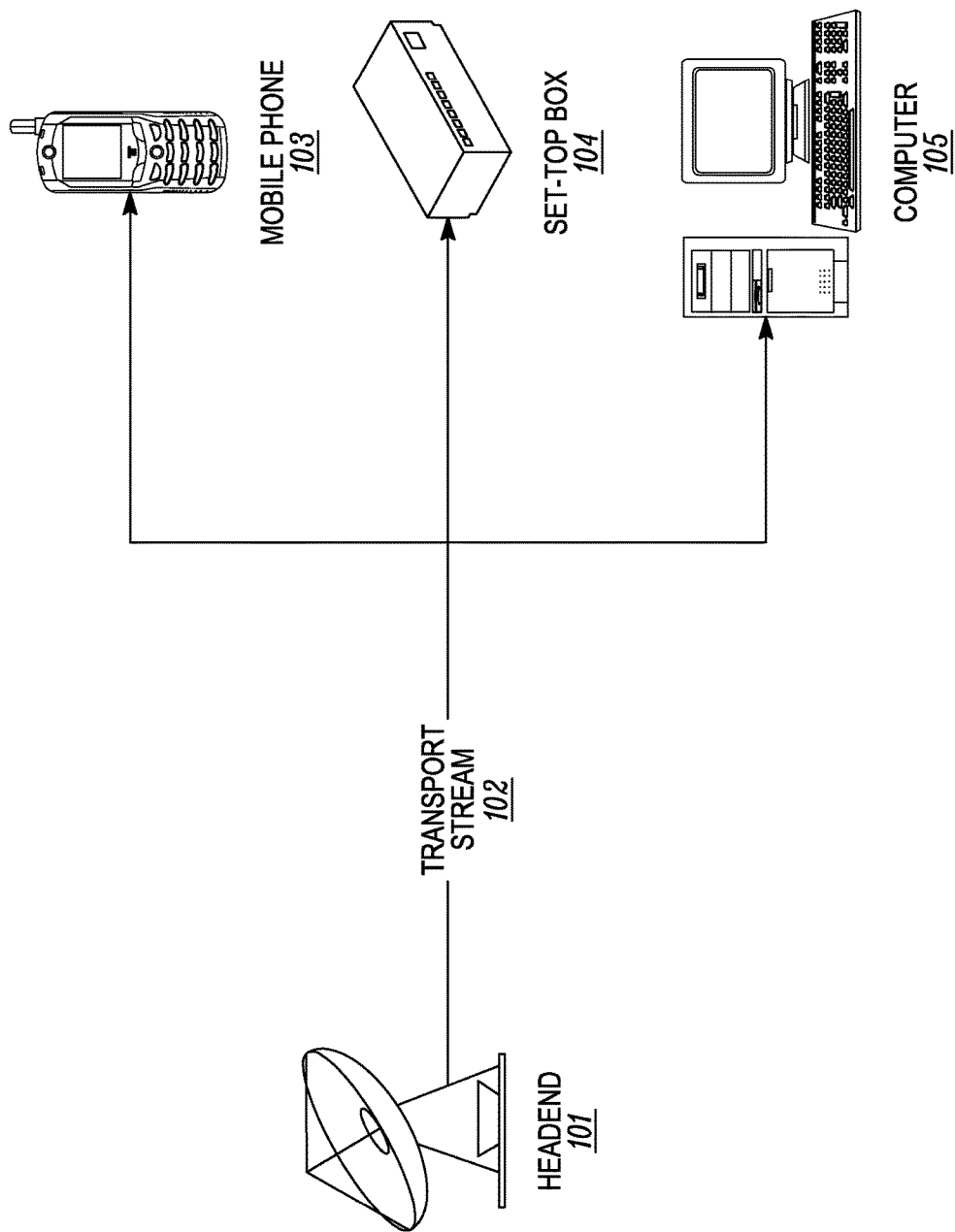
FIG. 1 is a system context diagram illustrating a content distribution system, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

As provided above, current HEVC scalable specification supports an application model where the base layer is AVC video with enhancements using scalable HEVC. In order to simplify the access unit (AU) structure and hypothetical reference decoder (HRD) model in scalable HEVC, there is a proposal to add an HEVC network abstraction layer (NAL) header to base layer AVC NAL units so that the bit stream looks like an HEVC video stream. This function could also be extended to use of MPEG-2 video as the base layer for an AVC or HEVC enhancement, where the MPEG-2 video access unit is encapsulated in an AVC or HEVC NAL unit.

However, the transport of such scalable streams requires the (AVC or MPEG-2 video) base layer to be available to a legacy decoder without the special NAL header in the video stream. Provided herein are systems and methods that achieve this—for MPEG-2 video base layer and for AVC base layer. Additionally, the disclosed systems and methods may also be applicable to HEVC base layer with enhancements using scalable AVC.

FIG. 1 depicts a system context diagram illustrating a content distribution system (CDS) 100, according to an embodiment. In CDS 100, a content distribution facility, such as a headend 101, may be used to package and distribute protected content, such as video-based content or video content. The video content may be packaged and transmitted, for example, via transport stream (TS) 102, such as an MPEG-2 transport stream, AVC transport stream or HEVC transport stream. TS 102 may include a plurality of video and audio streams associated with different data formats and programs provided through the CDS 100 to various types of client premises equipment (CPE) and client devices such as, for example, a cell phone 103, a set-top box 104 and a computer 105. Other CPEs and client devices may include multimedia devices (e.g., digital cameras, personal digital assistants, mobile phones, color facsimile, printers, scanners, etc.).

Figure 2:
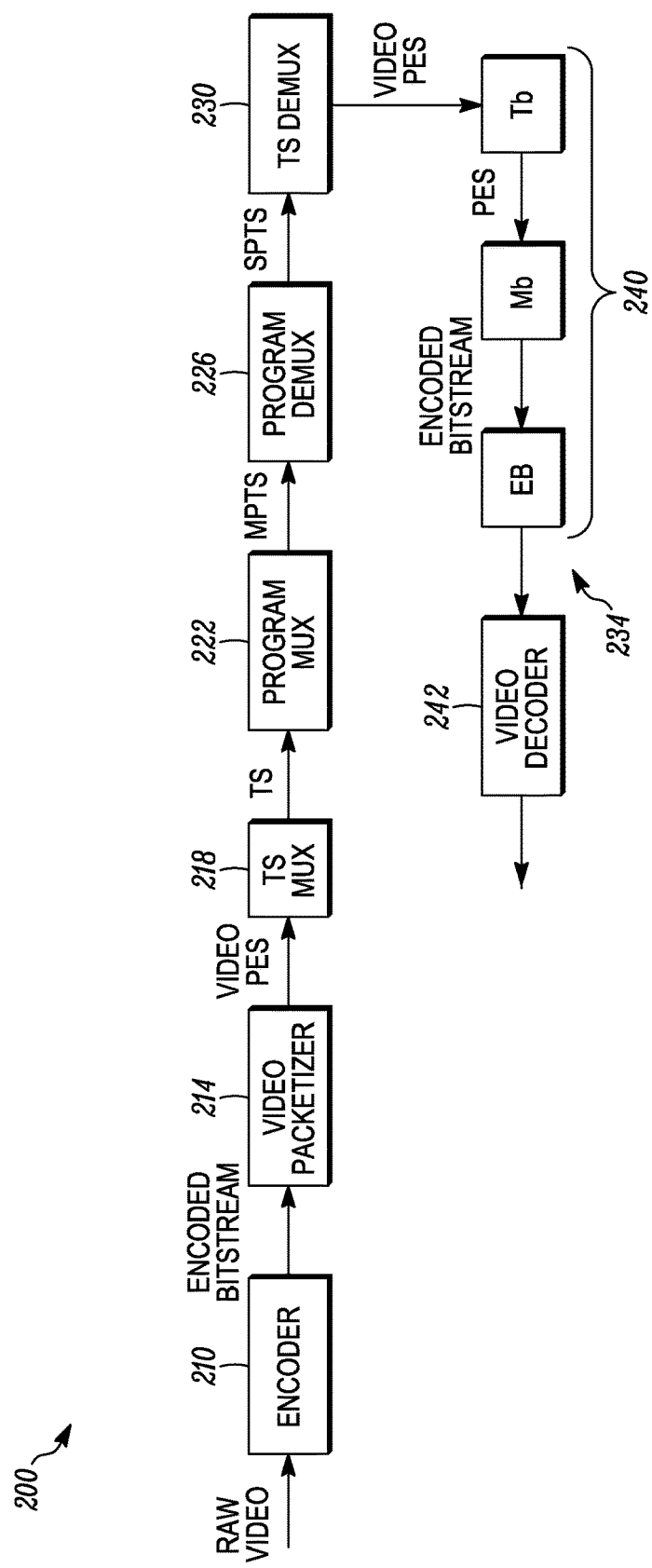
FIG. 2 is a block schematic illustration of the architecture of a first system for supplying compressed video material for presentation.

Before reaching headend 101, or as part of headend 101, the video content is encoded. Referring now to FIG. 2, a video encoder 210 receives raw video data, from a source such as a camera. The video encoder utilizes the video data to generate a video elementary stream and supplies the video elementary stream to a video packetizer 214, which produces a video packetized elementary stream (PES) composed of variable length packets. Typically, each packet of the video PES contains one or more video frames. Similarly, an audio encoder (not shown) receives raw audio data from, for example, a microphone and supplies an audio elementary stream to an audio packetizer (not shown), which creates an audio PES composed of variable length packets. For simplification, only video encoding/decoding is shown and audio encoding/decoding is not discussed further.

The video packetizer supplies the video PES to a transport stream multiplexer 218, which assigns program identifiers (PIDs) to the video PES and organizes the variable-length packets of the video PES as fixed-length transport stream (TS) packets having a header that includes the PID of the PES and a payload containing the PES video data. The length of PES packets are provided or indicated by a PES_packet_length field.

The single program transport stream (SPTS) that is output by the transport stream multiplexer may be supplied to a program multiplexer 222 that combines the SPTS with other transport streams, conveying other programs, to produce a multi-program transport stream (MPTS). The MPTS is transmitted over a channel to a receiver at which a program demultiplexer 226 separates a selected SPTS from the MPTS and supplies it to a transport stream demultiplexer 230. It will be appreciated by those skilled in the art that the SPTS that is output by the transport stream multiplexer may be transmitted directly to the transport stream demultiplexer without first being combined with other transport streams to create the MPTS but in either case the transport stream demultiplexer receives the transport stream packets of the selected SPTS and separates them on the basis of PID, depacketizes the transport stream packets to recreate the PES packets, and directs the video PES to a so-called video system target decoder (T-STD) 234.

The video T-STD 234 includes a system target decoder buffer 240 and a video decoder 242. The STD buffer 240 is functionally equivalent to a transport buffer Tb, a multiplexing buffer Mb, and an elementary stream buffer Eb. The transport buffer Tb receives the video PES at a variable bit rate and outputs the data at a constant bit rate to the multiplexing buffer Mb, which depacketizes the video PES and supplies an encoded bit stream at a constant bit rate to the elementary stream buffer Eb. The elementary stream buffer, which is sometimes referred to as the decoder buffer or as the coded picture buffer (CPB), receives the CBR bitstream and holds the bits for decoding a picture until they are all removed instantaneously by the video decoder at the picture decode time.

The bitstream produced by the video encoder 210 may comply with the video compression standard that is specified in ISO/IEC 14496-10 (MPEG-4 part 10) Advanced Video Coding (AVC), commonly referred to as H.264/AVC. H.264/AVC uses picture as a collective term for a frame or field. H.264/AVC defines an access unit (AU) as a set of network abstraction layer (NAL) units and specifies that the decoding of an access unit always results in a decoded picture. A NAL unit of an AU produced by an AVC encoder may be a video coding layer (VCL) unit, which includes picture information, or a non-VCL unit, which includes other information, such as closed captioning and timing.

A decoder having the capability to decode both a base layer and one or more enhancement layers is referred to herein as a scalable video decoder, whereas a decoder that cannot recognize an enhancement layer and is able to decode only the base layer access units, and therefore does not have scalable decoding capability, is referred to herein as a legacy base layer decoder. The legacy base layer decoder may be configured to decode AVC, HEVC, or MPEG-2 base layer access units, for example. The scalable video decoder may be configured to decode AVC, HEVC, or MPEG-2 base layer access units and/or AVC and HEVC enhancement access units.

In one example, an access unit produced by a scalable video encoder comprises not only the base layer NAL units mentioned above, which may include AVC NAL units, but also HEVC NAL units. A scalable video decoder that extracts the base layer NAL units from the access unit selects only the AVC NAL units. The scalable video decoder that extracts the enhancement layer NAL units from the access units selects both the AVC NAL units and HEVC NAL units.

Figure 3:
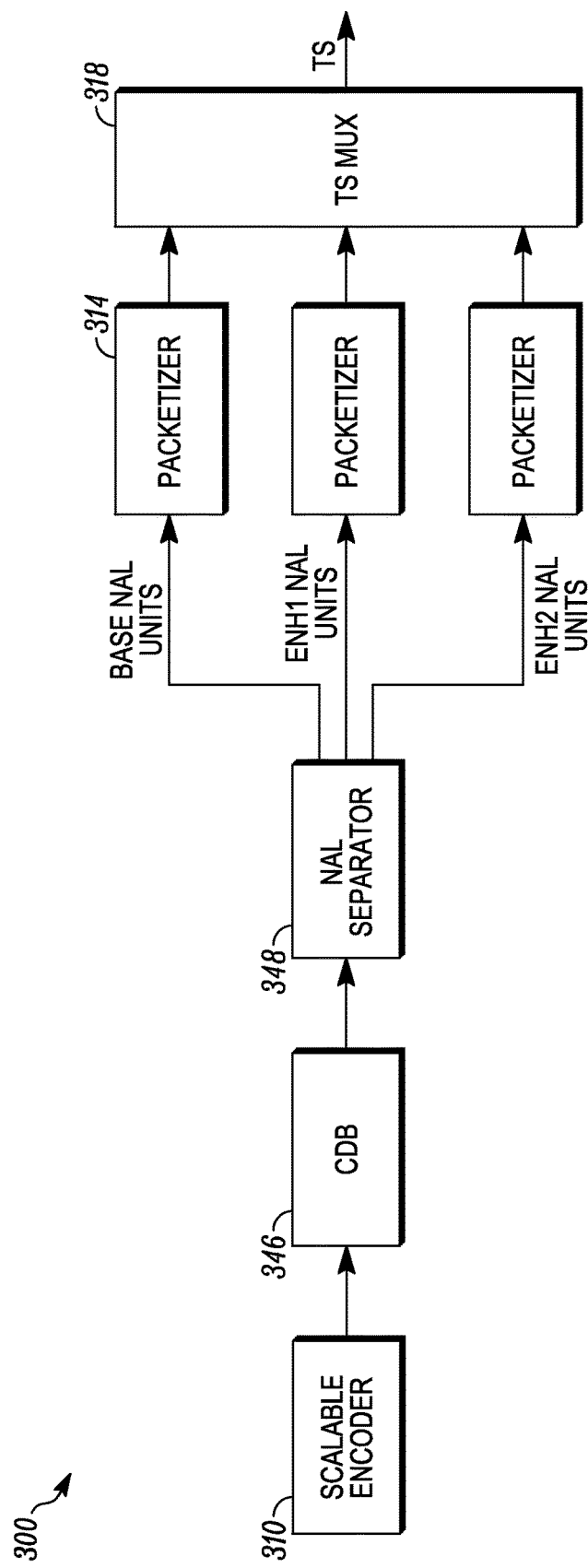
FIG. 3 is a block schematic illustration of the architecture and use case for transmission of compressed scalable video coded material for decode and presentation, according to an embodiment.

Referring to FIG. 3, a scalable video encoder 310 generates a unitary bitstream that conveys the base layer and, for example, two enhancement layers ENH1 and ENH2. Depending on its capabilities, a decoder might expect to receive, and decode, the base layer only, or the base layer and enhancement layer ENH1, or the base layer and both enhancement layer ENH1 and enhancement layer ENH2. Under an MPEG-2 systems standard and use case for SVC, the encoder may not provide three bitstreams, conveying respectively the base layer only, the base layer and enhancement layer ENH1, and the base layer and both enhancement layer ENH1 and enhancement layer ENH2 and allow the decoder to select whichever bitstream it is able to decode. The encoder must provide the base layer access units and parts of each enhancement layer in separate bitstreams. It would be possible in principle to comply with the MPEG-2 systems standard by using a NAL separator 348 to separate the unitary bitstream into three sub-bitstreams. One sub-bitstream would convey the base layer NAL units and the other two sub-bitstreams would convey the NAL units for the two enhancement layers respectively. The three sub-bitstreams would pass to respective video packetizers (generally designated 314), which create respective video PESs. The three video PESs would be supplied to a transport stream multiplexer 318 including a T-STD buffer equivalent to the buffer that is included in a scalable video T-STD, for the purpose of multiplexing together the outputs of the three packetizers. The multiplexer 318 would assign different PIDs to the three PESs and output a transport stream conveying the three layers.

The video T-STD 234 shown in FIG. 1 is unable to decode the bitstream conveyed by the transport stream produced by the transport stream multiplexer 318' shown in FIG. 3 because it provides no capability to reassemble the base layer and enhancement layer access units to produce a complete scalable video coded access unit that can be decoded by a scalable video decoder and a legacy decoder. Therefore, the architecture shown in FIG. 3 has hitherto lacked practical application.

Figure 4:
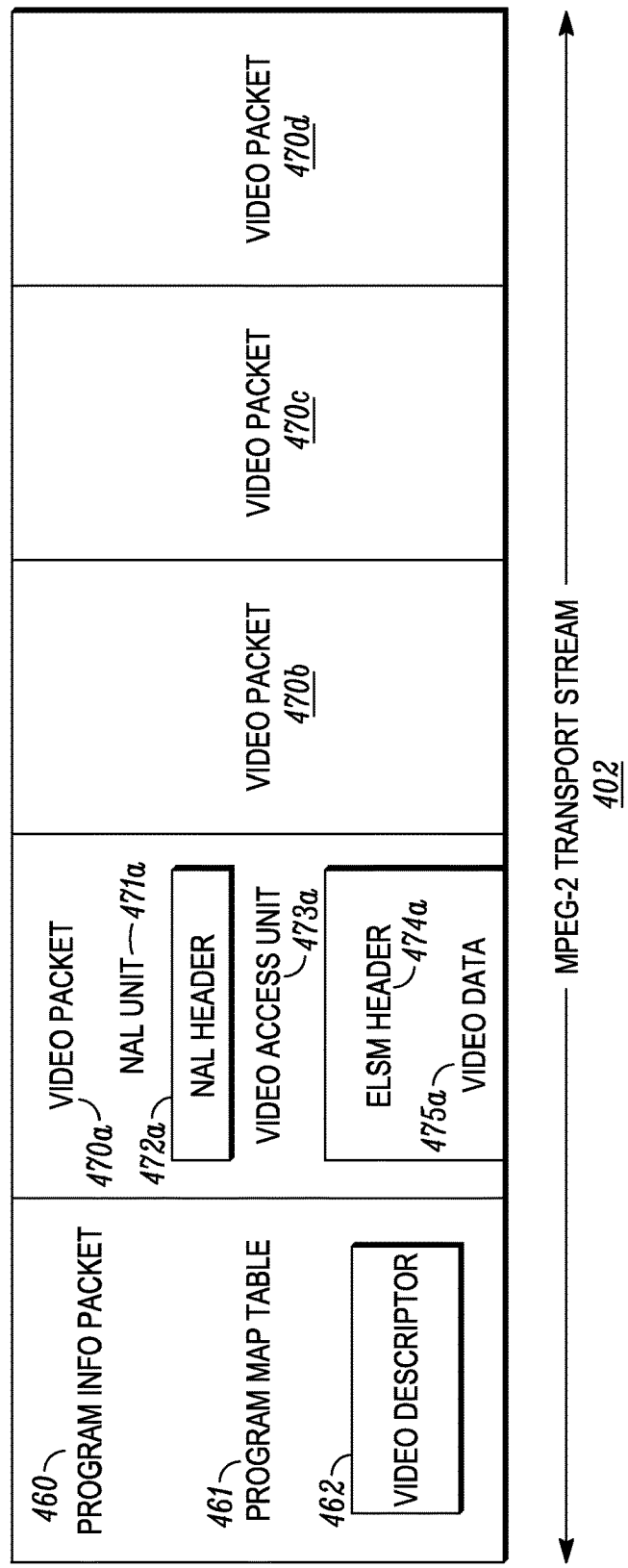
FIG. 4 is a breakout frame of an MPEG-2 transport stream, illustrating encoding packets carried in the MPEG-2 transport stream, according to an embodiment.

FIG. 4 is a breakout frame of an MPEG-2 transport stream, illustrating encoding packets carried in the MPEG-2 transport stream, such as transport stream 102 of FIG. 1. MPEG-2 transport stream 402 may include a PES which are the video packets 470a to 470d and the program information packet 460, according to an embodiment. The program information packet (PIP) 460 includes control information to reference one or a plurality of video packets, such as video packets 470a to 470d. The program information packet 460 includes control information, such a program map table (PMT) 461 including a video descriptor 462 to reference the video packets 470a to 470d. The video descriptor 462 includes information describing what types of video data, such as video data 475a, may be included in a video packet, such as video packet 470a, and how the video data is used, such as use in a still picture, a slide show or as frames of video in a video sequence used in a program specified within PMT 461. In another embodiment, a PES may include only video packets which may be referenced by control information, such as the information in the video descriptor 462, which is not located in a program information packet associated with a PES in a transport stream but is instead located elsewhere in the transport stream including the PES. It should be appreciated that the video data 475a encoded in video packets 470a to 470d may comply with various industry compression standards, including AVC and HEVC.

The video packets in the PES illustrated in FIG. 4 include video packets 470a to 470d. Video packet 470a is representative of the other video packets 470b to 470d. It includes a NAL unit 471a and a video access unit 473a. The NAL unit 471a includes a NAL header 472a. As provided above, the NAL header 472a may be an HEVC NAL header so that the bit stream looks like an HEVC video stream.

The program information packet 460 includes control information for managing and/or using the video packets 470a to 470d. The program information packet 460 associated with video packet 470a includes a program map table (PMT) 461 which includes video descriptor 462. The information in video descriptor 462 may be used to direct usage of access unit 473a in the video packet 470a. The video packets 470a to 470d may be included in a video PES which is multiplexed with other elementary streams and program streams in the MPEG-2 transport stream 402.

The video access unit 473a includes encoded video data 475a and an elementary stream (ELSM) header 474a. The video data 475a in the access unit 473a, before it is encoded, may be referred to as image data. The image data encoded in the video access unit 473a may be associated with a single frame or a still picture of image data. A video access unit, such as video access unit 473a, is a unit of encoded image data for a complete frame in a video or a still picture. The video access unit 473a also includes parameters in the ELSM header 474a which may be used to decode the access unit 473a and to display the decoded image data. The information in the video descriptor 462 and the ELSM header 474a both reference the video data 475a, but in different ways. In comparison with the information in the video descriptor 462, the ELSM header 474a in the access unit 473a contains relatively low level video-centric data for decoding and displaying the video data 475a as decoded image data. As noted above, the information in the video descriptor 462 is used to direct usage of the access unit 473a in the video packet 470a. This is a higher level referencing than in the ELSM header 472a.

The MPEG-2 transport stream 402 including video packets, such as video packets 470a to 470, may be used in client/server communications (e.g., the Internet, Image database, video streaming, video server, etc.) distributing cinema and for the exchange of content as well as the contribution of content to service providers. It may also be used in entertainment services and over broadband services utilizing satellites, cable system, 3DTV systems and IPTV systems.

Figure 5:
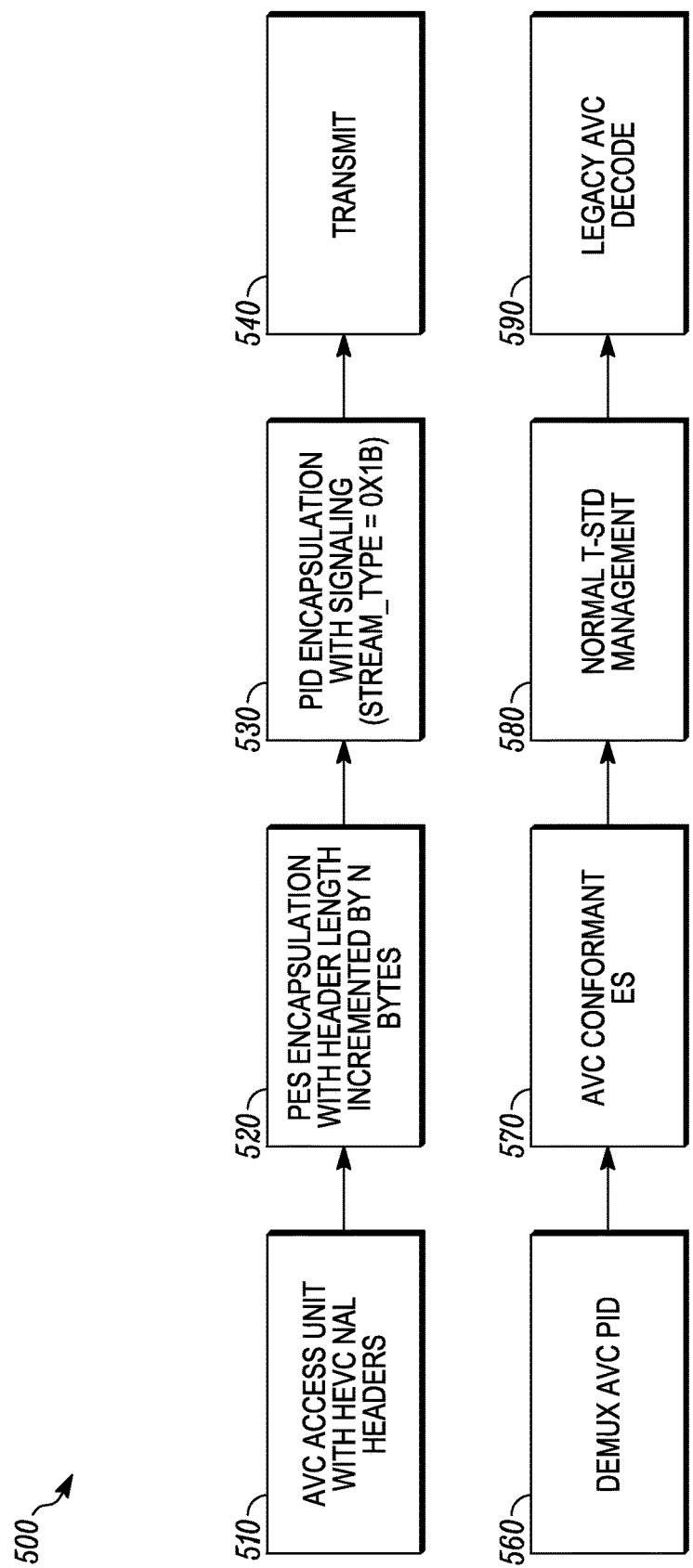
FIG. 5 is a flowchart of a representative method for delivering only an AVC base layer to a legacy decoder, according to an embodiment.

As provided above, there is a proposal to add an HEVC network abstraction layer (NAL) header to base layer AVC NAL units so that the bit stream looks like an HEVC video stream. FIG. 5 is a flowchart of a representative method 500 for delivering only an AVC base layer to a legacy decoder, according to an embodiment.

In block 510, for each AVC access unit, an HEVC NAL unit is provided as part of the video packet. In some embodiments, an HEVC NAL header is placed proximate to the AVC NAL header (e.g., so that it is immediately followed by the AVC NAL header and AVC access unit). The AVC NAL header may be included as part of an ELSM header.

Figure 9A:
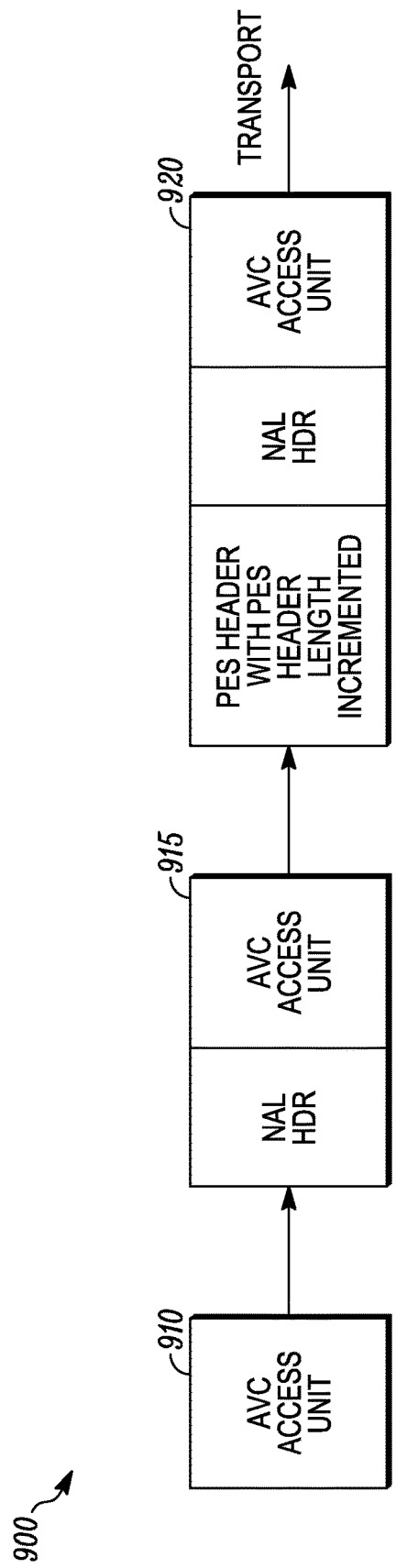
FIG. 9A is a block schematic illustrating a method of AVC encoding with a new NAL header, according to an embodiment.

Referring briefly to FIG. 9A, a general schematic illustrating a method 900 of AVC encoding with a new NAL header is provided. In block 910, an AVC access unit (AU) is provided. At block 915, an additional NAL header (e.g., HEVC NAL header) is added to the AVC AU. At block 920, each AU with the additional NAL header is PES packetized, where the PES packet length includes all the PES header data. The PES header includes an element PES packet length indicating the length of the PES header, so that demultiplexers can remove the header and access the video data when decoding.

In some embodiments, a new HEVC NAL unit type is used to signal and carry an entire AVC access unit. This may be specified in MPEG-2 transport, where this includes AU delimiter, supplemental enhancement information (SEI), sequence parameter set (SPS), picture parameter set (PPS), pictures or video slices, etc.

In block 520, the AVC base layer stream including an HEVC NAL header for each AVC access unit, is encapsulated in PES. In the PES, the HEVC NAL unit header start code, followed by AVC access unit, is aligned to the PES header for each AVC access unit.

In some embodiments, during PES encapsulation, the PES_packet_length field in the PES header is incremented by 'n' bytes where n=number of bytes of new HEVC NAL unit header, e.g., including the byte stream start code. As provided herein, 'n' is usually less than 10 bytes and represents a constant value. This incrementing of the PES_packet_length field may be referred to as modifying the PES header.

In block 530, PID encapsulation is performed. The AVC base layer is carried in a first separate or dedicated PID with the PMT signaling AVC legacy stream_type of 0x1B. The scalable HEVC enhancements are carried in second dedicated PID with a stream_type to be allocated by MPEG.

In block 540, the transport streams are transmitted over a channel to a receiver at which a demultiplexer separates them on the basis of PID and depacketizes the transport stream packets to recreate the PES packets in block 560. In block 570, PES packets that have an AVC conformant elementary stream are directed to a video system target decoder (T-STD).

In block 580, the video T-STD performs normal T-STD management, including depacketizing the PES into an encoded bit stream, such as described with reference to FIG. 2. In block 590, a legacy AVC decoder removes the bit stream at the picture decode time.

Figure 9B:
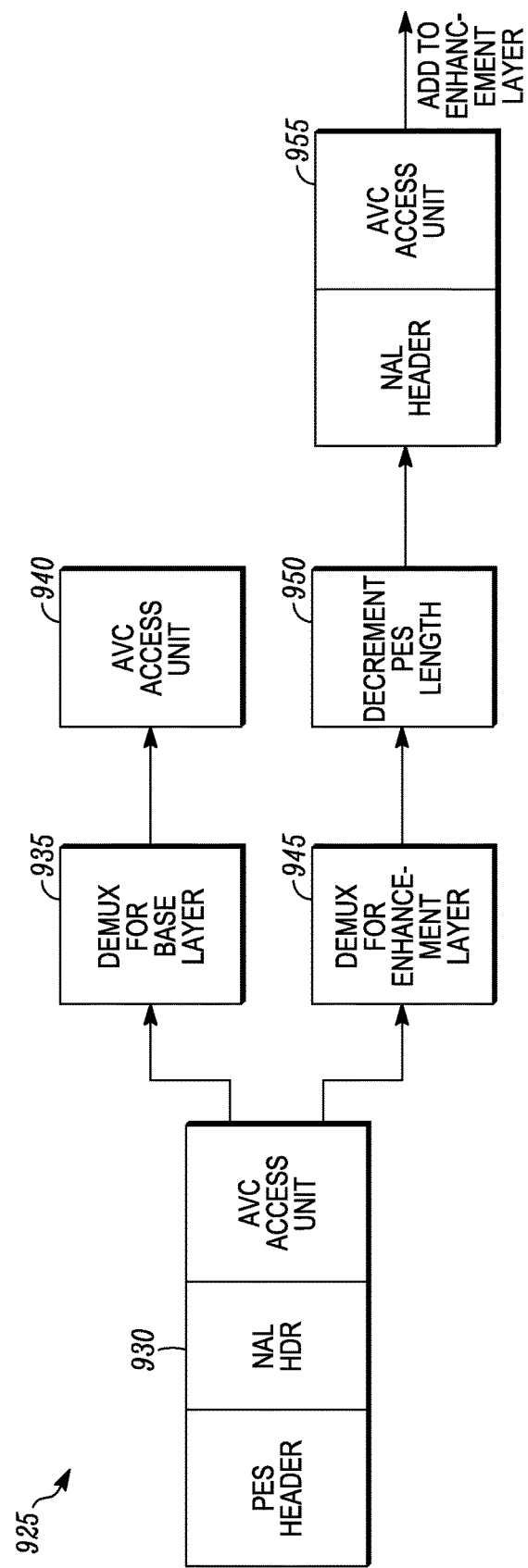
FIG. 9B is a block schematic illustrating a method of decoding an AVC encoded stream with a new NAL header, according to an embodiment.

Turning briefly to FIG. 9B, a general schematic illustrating a method 925 of decoding an AVC encoded stream with a new NAL header is provided. At block 930, the transport stream having packetized AUs with the additional NAL header is received. At block 935, a demultiplexer for the base layer depacketizes the transport stream packets to recreate the AVC access units in block 940. As is apparent from FIGS. 5 and 9B, only the AVC access units are provided to the legacy decoders because the new NAL headers has been treated as part of the modified PES, which have been removed by the demultiplexers.

Figure 6:
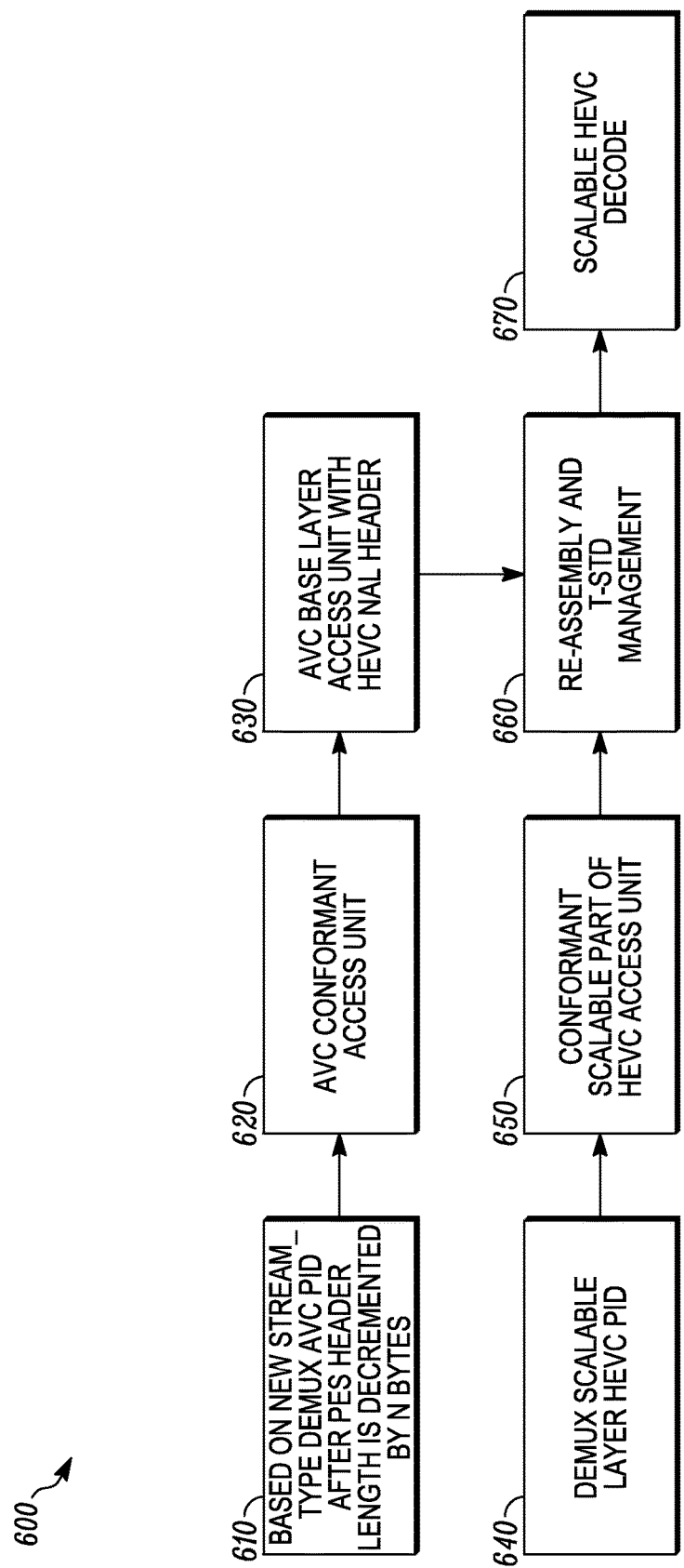
FIG. 6 is a flowchart of a representative method for assembling an AVC base layer and HEVC enhancement layer by a scalable HEVC decoder, according to an embodiment.

FIG. 6 is a flowchart of a representative method 600 for assembling an AVC base layer and HEVC enhancement layer by a scalable HEVC decoder, according to an embodiment. In block 610, the PES_packet length field in the PES header is decremented by 'n' bytes where n=number of bytes of new HEVC NAL unit header, e.g., including the byte stream start code. As provided herein, 'n' is usually less than 10 bytes and represents a constant value. This decrementing of the PES_packet_length field may be referred to as returning to the original PES header.

The transport streams are transmitted over a channel to a receiver at which a demultiplexer separates them on the basis of PID and depacketizes the transport stream packets to recreate the PES packets. In block 620, PES packets that have AVC conformant access units are directed to a block 630, where the AVC base layer access units with HEVC NAL header are provided.

Turning back to FIG. 9B, at block 945, a demultiplexer for the enhancement layer depacketizes the transport stream packets and decrements the PES header length to provide an original PES header in block 950. As shown in block 955, the AVC access units with the new HEVC NAL header is passed onto a scalable video decoder.

As provided in the discussion of FIG. 5, the scalable HEVC enhancements are carried in second dedicated PID with a stream type to be allocated by MPEG. In block 640, the scalable HEVC enhancements are separated on the basis of PID. In block 650, PES packets that have scalable HEVC conformant access units are provided.

Thereafter, in block 660, the AVC base layer access units with HEVC NAL header from block 630 and the scalable HEVC conformant access units from block 650 are reassembled and directed to a T-STD that performs normal T-STD management, including depacketizing the PES into an encoded bit stream, such as described with reference to FIG. 2. In block 670, a scalable HEVC decoder removes the bit stream at the picture decode time.

While FIGS. 5 and 6 illustrate methods for encoding and decoding an AVC base layer with HEVC enhancements, similar methods are also contemplated for encoding and decoding an HEVC base layer with AVC enhancements. Additionally, these methods can be extended to use of MPEG-2 video as the base layer for an AVC or HEVC enhancement, where the MPEG-2 video access unit is encapsulated in an AVC or HEVC NAL unit. In such embodiments, the transport of such scalable streams requires the (AVC or MPEG-2 video) base layer to be available to a legacy decoder without the special or modified NAL header in the video stream.

Figure 7:
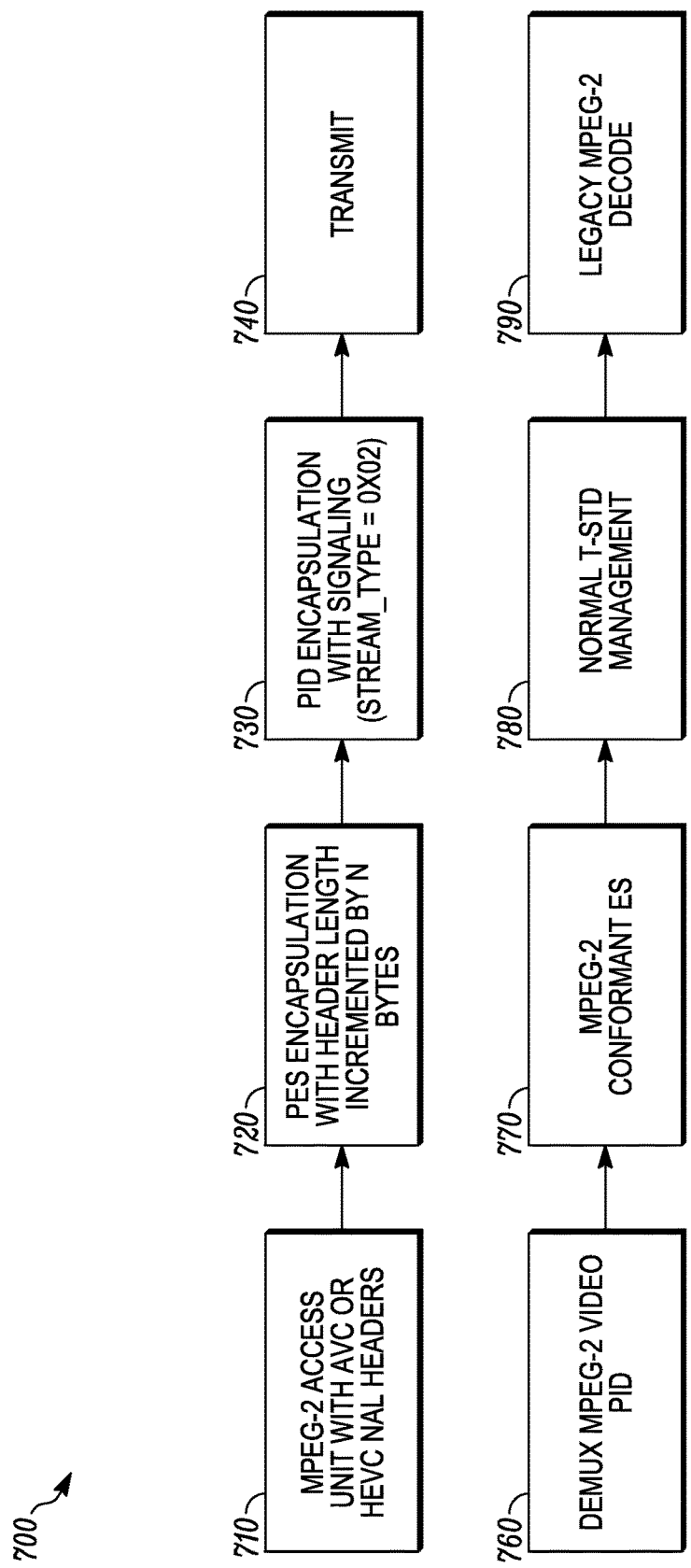
FIG. 7 is a flowchart of a representative method for delivering only MPEG-2 base layer to a legacy decoder, according to an embodiment.

FIG. 7 is a flowchart of a representative method 700 for delivering only MPEG-2 base layer to a legacy decoder, according to an embodiment. In block 710, for each MPEG-2 access unit, an AVC or HEVC NAL unit is provided as part of the video packet. For simplification, an HEVC NAL unit will be used as the enhancement layer, although it could be substituted with an AVC NAL unit. In some embodiments, an HEVC NAL header is placed proximate to the MPEG-2 NAL header (e.g., so that it is immediately followed by the MPEG-2 NAL header and MPEG-2 access unit). In some embodiments, the MPEG-2 video access unit includes a sequence header, GOP header, user data and picture header. The MPEG-2 NAL header may be included as part of an ELSM header.

In some embodiments, an HEVC NAL unit type may be used to signal the MPEG-2 video access unit that follows. This signaling may be specified in MPEG-2 transport, by use of a new stream type for the HEVC enhancements.

In block 720, the MPEG-2 base layer stream including an HEVC NAL header for each MPEG-2 access unit, is encapsulated in PES. In the PES, the HEVC NAL unit header start code, followed by MPEG-2 access unit, is aligned to the PES header for each MPEG-2 access unit.

In some embodiments, during PES encapsulation, the PES_packet_length field in the PES header is incremented by 'n' bytes where n=number of bytes of new HEVC NAL unit header, e.g., including the byte stream start code. As provided herein, 'n' is usually less than 10 bytes and represents a constant value. This incrementing of the PES_packet_length field may be referred to as modifying the PES header.

In block 730, PID encapsulation is performed. The MPEG-2 base layer is carried in a first separate or dedicated PID with the PMT signaling AVC legacy stream_type of 0x02. The scalable HEVC enhancements are carried in second dedicated PID with a stream_type to be allocated by MPEG.

In block 740, the transport streams are transmitted over a channel to a receiver at which a demultiplexer separates them on the basis of PID and depacketizes the transport stream packets to recreate the PES packets in block 760. In block 770, PES packets that have an MPEG-2 conformant elementary stream are directed to a video system target decoder (T-STD).

In block 780, the video T-STD performs normal T-STD management, including depacketizing the PES into an encoded bit stream, such as described with reference to FIG. 2. In block 790, a legacy MPEG-2 decoder removes the bit stream at the picture decode time.

Figure 8:
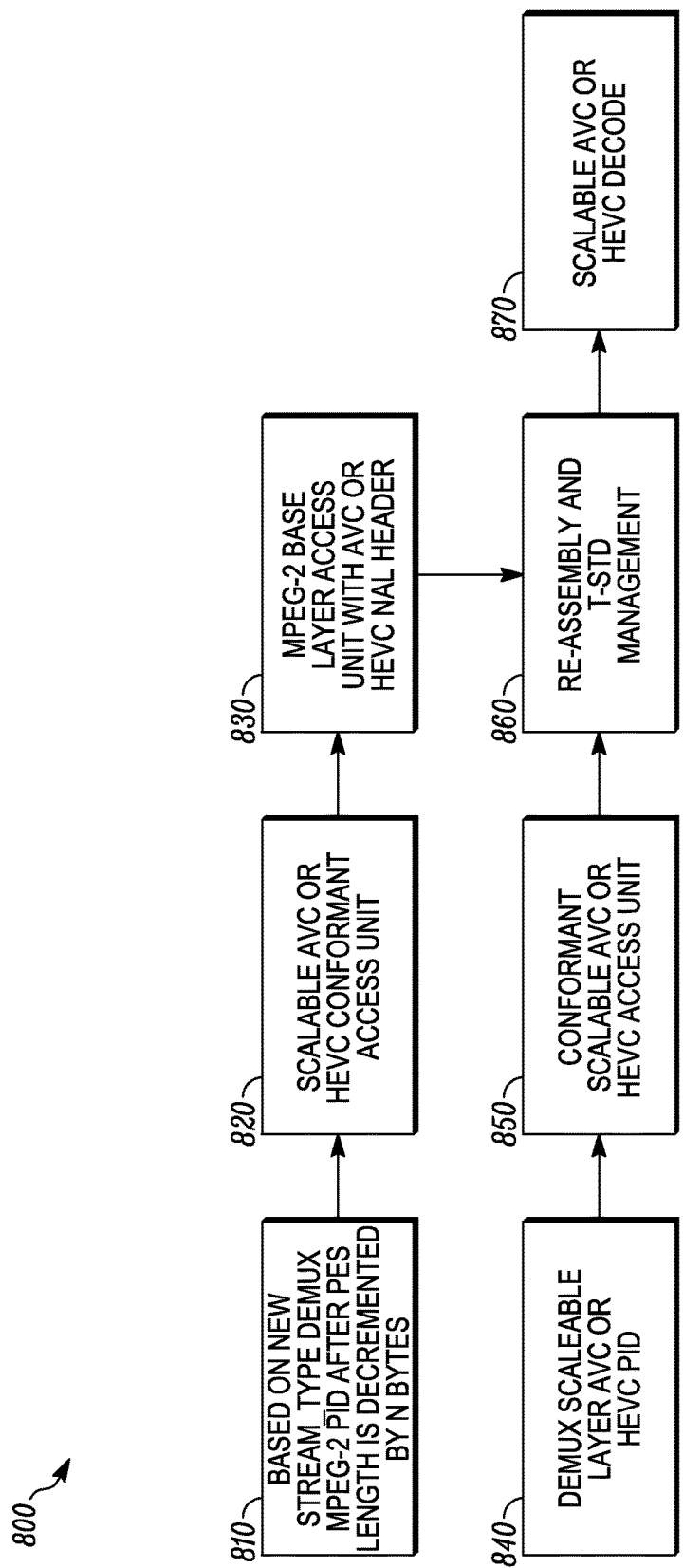
FIG. 8 is a flowchart of a representative method for assembling an MPEG-2 base layer and HEVC or AVC enhancement layer by a scalable HEVC or AVC decoder, according to an embodiment.

FIG. 8 is a flowchart of a representative method 800 for assembling an MPEG-2 base layer and HEVC or AVC enhancement layer by a scalable HEVC or AVC decoder, according to an embodiment. For simplification, an HEVC NAL unit will be used as the enhancement layer, although it could be substituted with an AVC NAL unit. In block 810, the PES_packet_length field in the PES header is decremented by 'n' bytes where n=number of bytes of new HEVC NAL unit header, e.g., including the byte stream start code. As provided herein, 'n' is usually less than 10 bytes and represents a constant value. This decrementing of the PES_packet_length field may be referred to as returning to the original PES header.

The transport streams are transmitted over a channel to a receiver at which a demultiplexer separates them on the basis of PID and depacketizes the transport stream packets to recreate the PES packets. In block 820, PES packets that have MPEG-2 conformant access units are directed to a block 830, where the MPEG-2 base layer access units with HEVC NAL header are provided.

As provided in the discussion of FIG. 7, the scalable HEVC enhancements are carried in second dedicated PID with a stream_type to be allocated by MPEG. In block 840, the scalable HEVC enhancements are separated on the basis of PID. In block 850, PES packets that have scalable HEVC conformant access units are provided.

Thereafter, in block 860, the MPEG-2 base layer access units with HEVC NAL header from block 830 and the scalable HEVC conformant access units from block 850 are reassembled and directed to a T-STD that performs normal T-STD management, including depacketizing the PES into an encoded bit stream, such as described with reference to FIG. 2. In block 870, a scalable HEVC decoder removes the bit stream at the picture decode time.

Figure 10:
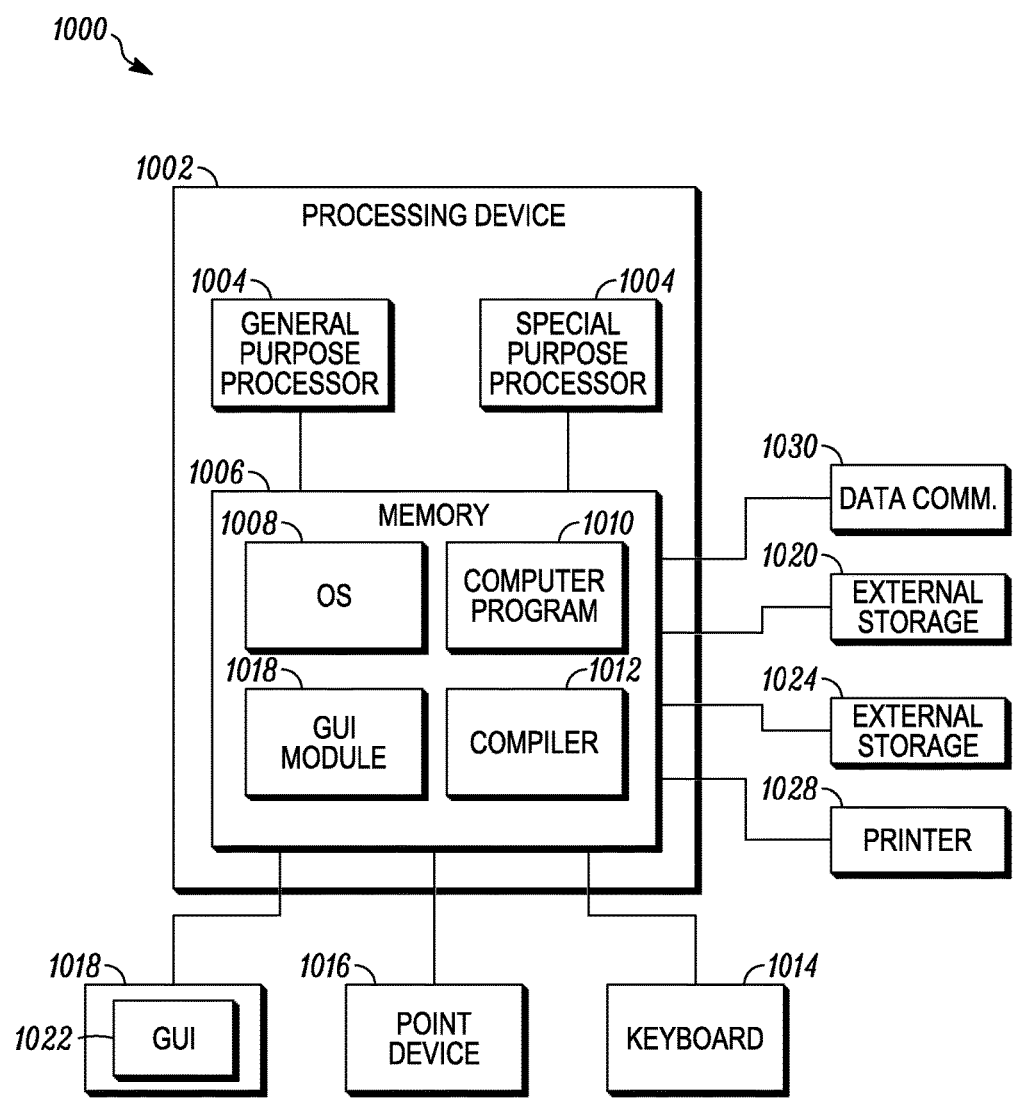
FIG. 10 is a block schematic diagram of a computing machine that may be used to implement parts of the processes provided in the disclosure.

FIG. 10 is a diagram illustrating an example computer system 1000 that could be used to implement elements of the disclosure including, encoders, NAL separators, packetizers, demultiplexers, and decoders. The computer system 1000 includes a processing device such as a computer 1002, which comprises a general purpose hardware processor 1004A and/or a special purpose hardware processor 1004B (hereinafter alternatively collectively referred to as processor 1004) and a memory 1006, such as random access memory (RAM). The computer 1002 may be coupled to other devices, including input/output (I/O) devices such as a keyboard 1014, a mouse device 1016 and a printer 1028.

In one embodiment, the computer 1002 operates by the general purpose processor 1004A performing instructions defined by the computer program 1010 under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008 to provide output and results.

In some embodiments, the computer program 1010 is composed of instructions such that when the computer 1002 receives a bitstream conveying the particular input signal involved, by way of an input adaptor, the computer 1010 allocates memory 1006 to appropriate buffers and utilizes other suitable resources and functions to perform the various operations that are described above with reference to FIGS. 1-9 and transmits, by way of an output adaptor, a bitstream conveying the particular output signal.

Output/results may be presented on the display 1022 or provided to another device for presentation or further processing or action. In one embodiment, the display 1022 comprises a liquid crystal display (LCD) having a plurality of separately addressable pixels formed by liquid crystals. Each pixel of the display 1022 changes to an opaque or translucent state to form a part of the image on the display in response to the data or information generated by the processor 1004 from the application of the instructions of the computer program 1010 and/or operating system 1008 to the input and commands. Other display 1022 types also include picture elements that change state in order to create the image presented on the display 1022. The image may be provided through a graphical user interface (GUI) module 1018A. Although the GUI module 1018A is depicted as a separate module, the instructions performing the GUI functions can be resident or distributed in the operating system 1008, the computer program 1010, or implemented with special purpose memory and processors.

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement embodiments of the present disclosure. Further, the special purpose processor 1004B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1002 may also implement a compiler 1012 which allows an application program 1010 written in a programming language such as COBOL, C++, FORTRAN, or other language to be translated into processor 1004 readable code. After completion, the application or computer program 1010 accesses and manipulates data accepted from I/O devices and stored in the memory 1006 of the computer 1002 using the relationships and logic that was generated using the compiler 1012.

The computer 1002 also optionally comprises an external communication device such as a modem, satellite link, Ethernet card, or other device for accepting input from and providing output to other computers. In one embodiment, instructions implementing the operating system 1008, the computer program 1010, and/or the compiler 1012 are tangibly embodied in a computer-readable medium, e.g., data storage device, which could include an internal storage device 1020 or external storage device 1024 in the form of one or more fixed or removable data storage devices, such as a zip drive, floppy disc drive, hard drive, CD-ROM drive, tape drive, or a flash drive. Further, the operating system 1008 and the computer program 1010 are comprised of computer program instructions which, when accessed, read and executed by the computer 1002, causes the computer 1002 to perform the steps necessary to implement and/or use embodiments of the present disclosure or to load the program of instructions into a memory, thus creating a special purpose data structure causing the computer to operate as a specially programmed computer executing the method steps described herein. Computer program 1010 and/or operating instructions may also be tangibly embodied in memory 1006 and/or data communications devices 1030, thereby making a computer program product or article of manufacture according to the disclosure. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1002.

Although the term "computer" is referred to herein, it is understood that the computer may include portable devices such as cellphones, portable MP3 players, video game consoles, notebook computers, pocket computers, or any other device with suitable processing, communication, and input/output capability.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of packetized elementary stream (PES) encapsulation from elementary streams, the method comprising:
   receiving a signal including frames of image data, wherein the frames include base layer and enhancement layer components;

encoding the frames of image data to form video access units (AUs) in elementary stream each base layer AUs is formed to correspond to at least one network abstraction layer (NAL) unit header conforming to a first video coding standard for base layer components, and each enhancement layer AUs is formed to correspond to at least one network abstraction layer (NAL) unit header conforming to a second video coding standard for enhancement layer components;

encapsulating the elementary streams in to a PES for transport, the encapsulating including:
identifying at least a portion of the base layer AUs in a first elementary stream and at least a portion of the enhancement layer AUs in a second elementary stream;
adding an additional NAL unit header conforming to the second video coding standard in to the first elementary stream, before the at least one NAL unit headers corresponding to the base layer AUs in the first elementary stream, such that the first elementary stream includes multiple NAL unit headers;
aligning a byte-stream start code in a PES header associated with the base layer AUs in the first elementary stream with the added NAL unit header;
in the PES header for the base layer AUs associated with the first elementary stream, incrementing a PES packet length, indicating the length of the PES payload following the byte-stream start code, by a number of bytes for the added NAL unit header.

2. The method of claim 1, further comprising:
mapping the AUs into PES packets; and
ordering the PES packets to form a PES in a transport stream,
wherein the transport stream includes a base layer formed from base layer AUs and an enhancement layer formed from enhancement layer AUs.

3. The method of claim 1, wherein a NAL unit header directly precedes each base layer AU.

4. The method of claim 1, wherein each HEVC NAL unit header is configured to signal and carry each AVC AU.

5. The method of claim 4, wherein each AVC AU includes at least one of: AU delimiter, SEI, SPS, PPS, and video slices.

6. The method of claim 1, further comprising:
mapping the AUs into PES packets; and
ordering the PES packets to form a PES in a transport stream,
wherein the transport stream includes a base layer formed from base layer AUs and an enhancement layer formed from enhancement layer AUs,
wherein the transport stream includes at least two packet identifiers (PIDs) and a program map table (PMT), and
wherein the AVC base layer PES packets are carried in a first dedicated PID.

7. The method of claim 6, wherein the PMT signals the base layer AVC with MPEG defined stream type of 0x1 B.

8. The method of claim 6, wherein the HEVC enhancement layer is carried in a second dedicated PID.

9. A method of decoding video data in a packetized elementary stream (PES), the method comprising:
receiving a transport stream including:
the PES, wherein the PES includes frames on image data in video access units (AUs) including both base layer AUs associated with at least one respective packet identifier (PID) in a plurality of packet identifiers (PID)s and enhancement layer AUs associated with a respective packet identifier in the plurality of PIDs,
wherein base layer AUs formed in the PES from base layer components are formed based on a first coding technology and enhancement layer AUs formed in the PES from enhancement layer components are formed based on a second coding technology;
determining a PES packet length received for the base layer AUs associated with the first PID, the PES packet length indicating the length of the PES payload following a byte-stream start code, said PES including multiple NAL unit headers, wherein the PES packet length is incremented to include a number of bytes for a NAL unit header conforming to a second video coding technology added before one or more NAL unit headers for the base layer AUs associated with the first PID, the one or more NAL unit headers for the base layer AUs conforming to a first video coding technology;
if the decoder is compliant with the first coding technology, decoding the base layer AUs in accordance with a start code in the PES header aligned with the added NAL unit header and the received PES packet length for re-assembly of an elementary stream comprised of the base layer AUs based on the one or more NAL unit headers conforming to the first video coding technology; and
if the decoder is compliant with the second coding technology, decrementing the PES packet length field by the number of bytes of the added NAL unit header conforming to the second video coding technology for re-assembly of the elementary stream comprised of the baser layer and enhancement layer AUs.

10. The method of claim 9, wherein the decoding is performed by a legacy decoder.

11. A method of decoding video data in a packetized elementary stream (PES), the method comprising:
receiving the PES, wherein the PES includes frames on image data in video access units (AUs) including both base layer AUs associated with at least one respective packet identifier (PID) in a plurality of packet identifiers (PID)s and enhancement layer AUs associated with a respective packet identifier in the plurality of PIDs and,
wherein base layer AUs are formed in the PES from base layer components based on a first coding technology and enhancement layer AUs are formed in the PES from enhancement layer components based on a second coding technology
determining a PES packet length received for the base layer AUs associated with the first PID, the PES packet length indicating the length of the PES payload following a byte-stream start code, said PES including multiple NAL unit headers, wherein the PES packet length is incremented to include a number of bytes for a NAL unit header conforming to a second video coding technology added before one or more NAL unit headers for the base layer AUs associated with the first PID, the one or more NAL unit headers for the base layer AUs conforming to a first video coding technology;
forming an original PES header by decreasing the PES packet length by the value that represents the added NAL unit header length;

removing the original PES header for each base layer AU;
removing the original PES header for each enhancement layer AU; and
decoding each base layer AU and each enhancement layer AU to form a signal including frames of image data, wherein the base layer AUs are Advanced Video Coding (AVC) video data and the NAL unit header is exclusively HEVC video data.

12. The method of claim 11, further comprising:
receiving a signal indicating that the modified PES header will be decremented by the constant value.

13. A system configured to encode video data in a packetized elementary stream (PES), the system comprising:
a processor configured to
receive a signal including frames of image data, wherein the frames include base layer and enhancement layer components;
encode the frames of image data to form video access units (AUs) in elementary stream each base layer AUs is formed to correspond to at least one network abstraction layer (NAL) unit header conforming to a first video coding standard for base layer components, and each enhancement layer AUs is formed to correspond to at least one network abstraction layer (NAL) unit header conforming to a second video coding standard for enhancement layer components;
encapsulating the elementary streams in to a PES for transport, the encapsulating including:
identify at least a portion of the base layer AUs in a first elementary stream and at least a portion of the enhancement layer AUs in a second elementary stream;
add an additional NAL unit header conforming to the second video coding standard in to the first elementary stream before the at least one NAL unit headers corresponding to the base layer AUs in the first elementary stream, such that the first elementary stream includes multiple NAL unit headers;
align a byte-stream start code in a PES header associated with the base layer AUs in the first elementary stream with the added NAL unit header;
in the PES header for the base layer AUs associated with the first elementary stream, increment a PES packet length, indicating the length of the PES payload following the byte-stream start code, by a number of bytes for the added NAL unit header, and
executable instructions for controlling the processor.

* * * * *